United States Patent
Jeong et al.

(10) Patent No.: US 7,931,927 B2
(45) Date of Patent: Apr. 26, 2011

(54) PREPARATION METHOD OF COOKED RICE WITH BARLEY IN ASEPTIC PACKING SYSTEM

(75) Inventors: Hyo-Young Jeong, Seoul (KR); Chang Yong Lee, Seoul (KR); Heon Woong Jung, Seoul (KR)

(73) Assignee: CJ Cheiljedang Corporation (KR)

( * ) Notice: Subject to any disclaimer, the term of this patent is extended or adjusted under 35 U.S.C. 154(b) by 463 days.

(21) Appl. No.: 11/890,069

(22) Filed: Aug. 3, 2007

(65) Prior Publication Data

US 2009/0004361 A1    Jan. 1, 2009

(30) Foreign Application Priority Data

Jun. 27, 2007   (KR) ................. 10-2007-0063442

(51) Int. Cl.
  *A23L 1/10*      (2006.01)
  *B65B 55/12*     (2006.01)
(52) U.S. Cl. ........ 426/462; 426/392; 426/399; 426/401; 426/618
(58) Field of Classification Search .................. None
  See application file for complete search history.

(56) References Cited

U.S. PATENT DOCUMENTS

| | | | | |
|---|---|---|---|---|
| 2,890,957 A | * | 6/1959 | Seltzer | 426/461 |
| 3,495,989 A | * | 2/1970 | Lewis et al. | 426/557 |
| 4,687,669 A | * | 8/1987 | Moritaka et al. | 426/72 |
| 4,707,371 A | * | 11/1987 | Yamaguchi et al. | 426/462 |
| 4,927,660 A | * | 5/1990 | Sano | 426/618 |
| 2004/0156962 A1 | * | 8/2004 | Lee et al. | 426/392 |

FOREIGN PATENT DOCUMENTS

| | | |
|---|---|---|
| JP | 06-303926 | 11/1994 |
| JP | 09-172992 | 7/1997 |
| KR | 10-1997-0064404 | 10/1997 |
| KR | 10-0228509 | 8/1999 |
| KR | 10-2004-0072301 | 8/2004 |
| KR | 10-2004-0092833 | 11/2004 |
| KR | 10-0558377 | 2/2006 |
| KR | 10-2006-0135119 | 12/2006 |

* cited by examiner

*Primary Examiner* — Timothy M Speer
*Assistant Examiner* — Felicia C King
(74) *Attorney, Agent, or Firm* — Cantor Colburn LLP

(57) ABSTRACT

The present invention relates to a method for preparing cooked rice with barley in an aseptic packing process, comprising mixing barley, which had been sterilization-treated and then dried, with non-glutinous rice. The method for preparing cooked rice with barley in an aseptic packing system according to the present invention is characterized in that by using barley that has been first gelatinized and then retrogradated, the cooked rice with barley has a reduced initial level of microorganisms in the barley, leading to excellent stability against microorganisms, a long storage life, of 6 months or longer at ambient temperature, excellent appearance, pleasant flavor, and soft, flexible, and sticky texture.

6 Claims, 4 Drawing Sheets

[Fig. 1]
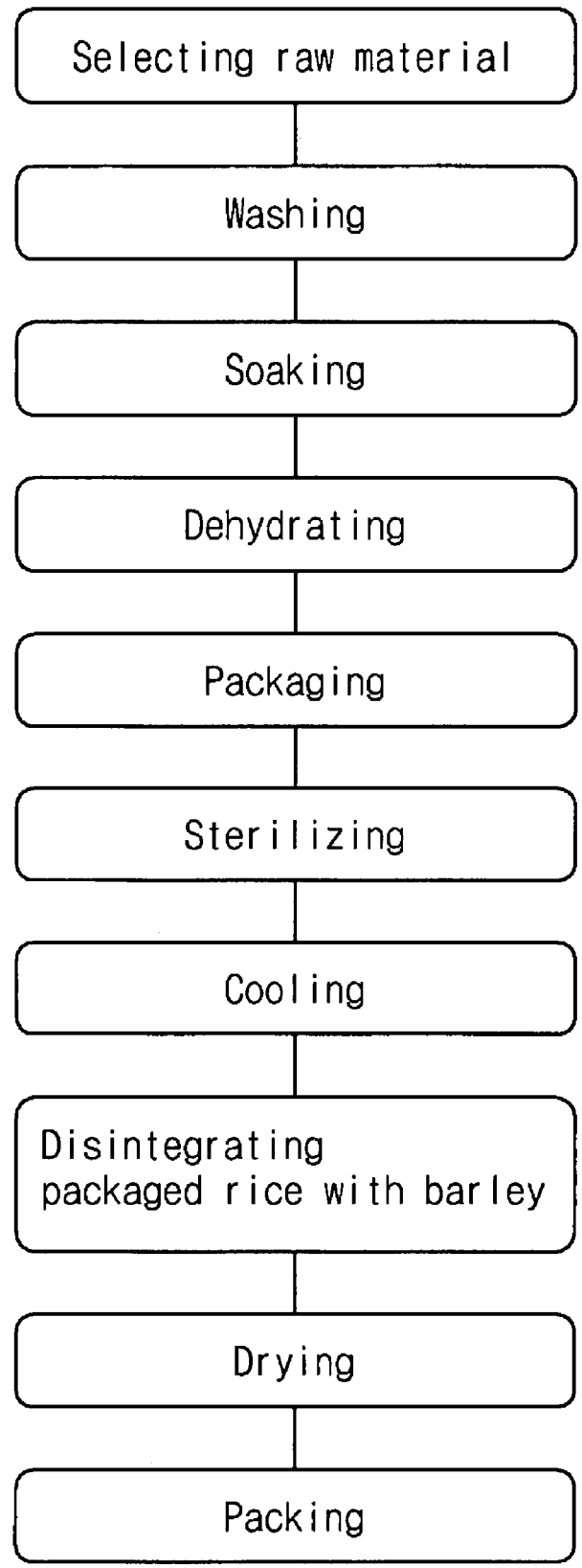

[Fig. 2]
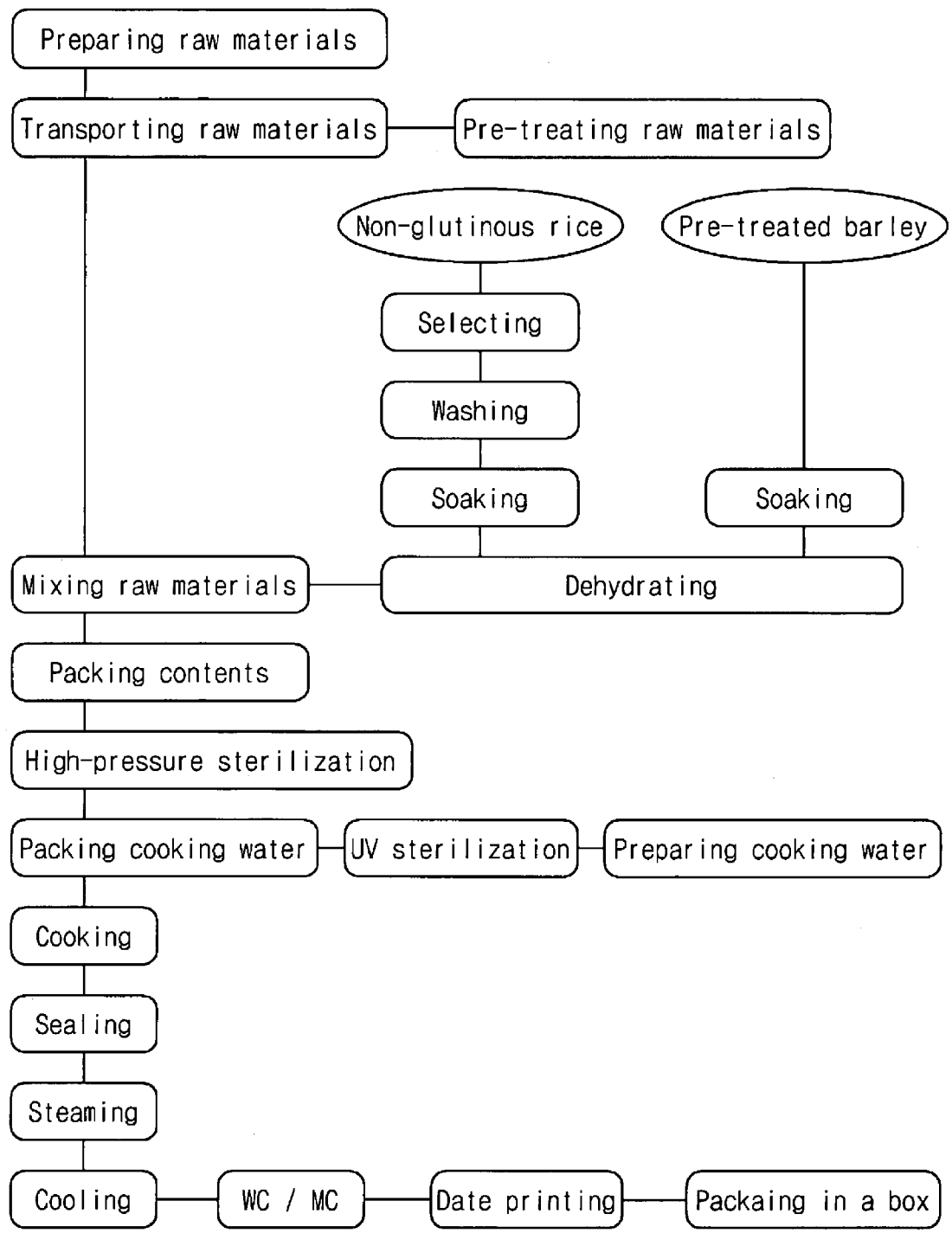

[Fig. 3]
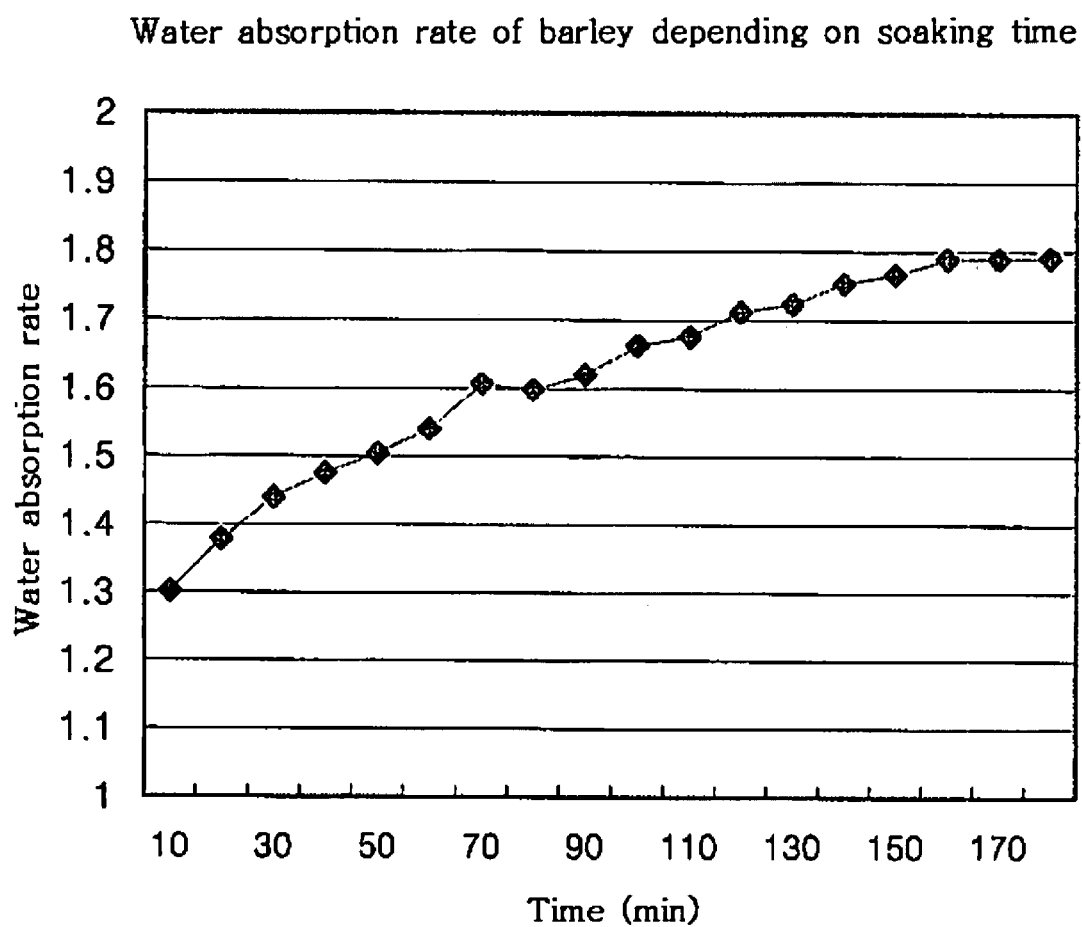

[Fig. 4]
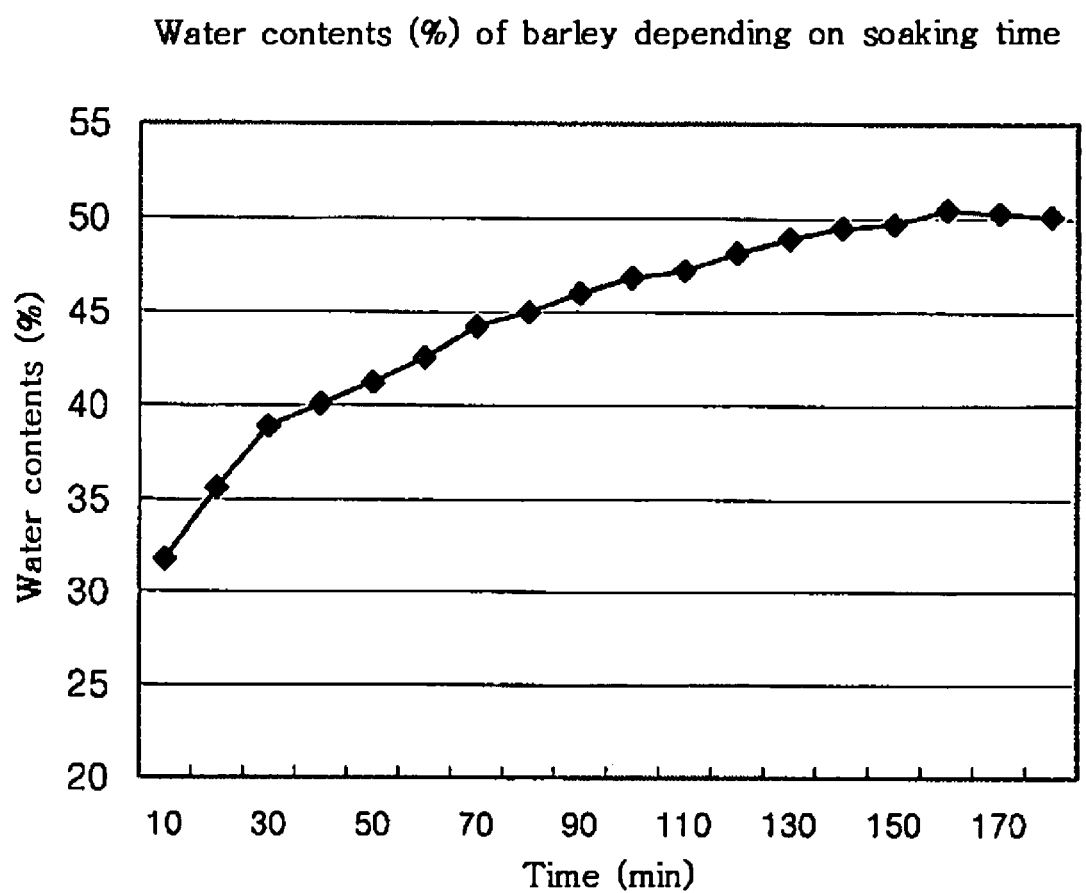

PREPARATION METHOD OF COOKED RICE WITH BARLEY IN ASEPTIC PACKING SYSTEM

BACKGROUND OF THE INVENTION

1. Field of the Invention

The present invention relates to a method for preparing cooked rice with barley in an aseptic packing system.

2. Description of the Related Art

Barley can be divided by the number of kernel rows in the head, which are two-row barley and six-row barley. Barley can be further classified into hulled barley, in which the husk adheres onto the grain upon threshing, and naked barley, in which the husk easily falls free from the grain upon threshing. The barley that is commonly used in cooked rice is naked barley. The naked barley is divided into waxy barley having waxy starch such as glutinous rice and non-glutinous rice, and common non-waxy barley (whole barley). The waxy barley is divided into waxy hulled barley having a husk and waxy naked barley having no husk, in which the waxy barley has higher contents of dietary fiber and beta-glucan than common barley (non-waxy barley). The starch of waxy barley has a low amylose content and a high amylopectin content, and as a result, when it is cooked, its water binding ability is higher than that of non-waxy barley, and thus waxy barley becomes more rapidly gelatinized and swelled. Further, waxy barley has a lower gelatinization temperature, and a higher viscosity than non-waxy barley, and as a result, when it is cooked, the cooking time is shortened, the cooked rice gets waxier, and the retrogradation of the rice is delayed, which leads to reduced retrogradation tendency after being cooled.

Approximately $10^3$ to $10^5$ CFU/g of microorganisms are present in the barley, and approximately $10^1$ to $10^2$ CFU/g of sporing, heat-resistant microorganisms are also present in the barley. In the case of cooked rice which is cooked and eaten daily at home or in plants, heat-resistant microorganisms are not harmful. However, if the cooked rice is intended to be stored and transported at ambient temperature over a long period of time, the proliferation of such heat-resistant microorganisms become significantly harmful. In particular, if common microorganisms or sporing, heat-resistant microorganisms are present in the trough portion of the barley, it is difficult to kill the microorganisms even when sterilizing the cooked rice with barley in an aseptic packing system, unlike the microorganisms in the hull.

Therefore, many studies have been made in order to control the heat-resistant microorganisms that are present in the trough portion of the barley in the preparation of cooked rice with barley in an aseptic packing system. In Japan, cut polished barley (barley that is divided into two portions in the trough direction), or rolled barley (barley that is pressed through a roller after permeation into a high-temperature vapor) has been used to prepare cooked rice with barley in an aseptic packing system. However, these products do not have native appearance of barley, and still have a problem in that the unique texture of barley cannot be tasted by the user.

Further, Korean Patent Application Publication No. 10-1997-64404 describes a method for preparing sanitized rice in a can (cooked rice, or cooked rice with barley in a can), which specifically comprises the steps of putting rice, barley, and beans with water into a can; steaming the mixture on a conveyor using high-pressure steam at about 100° C.; adding a predetermined amount of boiling water to the can which is passed through the conveyor and capping the can with a lid for sealing treatment; subjecting the processed can to treatment in cooling water under drastically reduced pressure, and then to high-pressure sterilization in a high-pressure steam furnace at about 120° C. for about 25 minutes for completion of the sterilization treatment to remove soil bacteria or other bacteria in the rice; and finally subjecting the can to pressurization treatment in a rapidly cooling furnace, thereby the contents of the can being vacuum-treated. However, in this Patent, the control of microorganisms in the starting raw materials is insufficient, and thus, there is an urgent need to ensure that long-term storage of rice and barley is safe.

Accordingly, many studies have been actively conducted so as to attain a safe long-term storage of rice and barley by minimizing the level of microorganisms in the starting raw materials during the preparation of cooked rice in an aseptic packing system. By way of one example, Korean Patent Granted No. 10-228509 describes a method for preparing cooked rice with various cereals which can be stored for a long period of time, comprising the steps of soaking various cereals such as red bean, millet, Indian millet, and black rice in a calcium salt solution at a concentration of 0.2 to 0.8%, and minimizing the level of microorganisms by heat treatment at 100 to 121° C. for 20 to 40 minutes. Korean Patent Granted No. 10-528491 describes a method for preparing cooked rice with nutritious ingredients which can be stored for a long period of time, comprising the steps of adding an aqueous organic acid solution at a concentration of 0.1 to 0.3% to an aqueous calcium solution, and soaking ginseng, jujube, chestnuts, black rice, and the like in the resulting solution, thereby reducing the initial level of microorganisms.

However, if the methods for controlling the microorganisms in the starting raw materials as described in the above-described Patents are employed for cooked rice with barley in an aseptic packing system, there are problems in that heat-resistant microorganisms that are present in the trough portion of barley are insufficiently controlled, and in that the unique texture of barley cannot be tasted by the user.

Under these circumstances, the present inventors have conducted studies on a method for pre-treating barley as a raw material, which can remarkably reduce the initial level of microorganisms that are present in barley as the raw material, while solving the problem in which the user cannot taste the unique texture of barley. As a result, they have found that cooked rice with barley in an aseptic packing system, which is obtained by using barley that has been first gelatinized and then retrogradated, has a reduced initial level of microorganisms in barley, leading to excellent stability against microorganisms, as well as good qualities such as soft and flexible texture, taste, and flavor that are similar to those obtained by a domestic conventional cooking method, thereby completing the present invention.

SUMMARY OF THE INVENTION

It is an object of the present invention to provide a method for preparing cooked rice with barley in an aseptic packing system having the qualities of soft and flexible texture, and excellent taste and flavor, and can be stored for a long period of time at ambient temperature.

BRIEF DESCRIPTION OF THE DRAWINGS

FIG. 1 is a flow chart showing the pre-treatment process of barley.

FIG. 2 is a flow chart showing the process for preparing cooked rice with barley in an aseptic packing system according to the present invention.

FIG. 3 is a drawing showing a change in the water absorption of barley (weight after, soaking/weight before soaking) depending on soaking time.

FIG. 4 is a drawing showing a change in the water content (%) of barley depending on soaking time.

DESCRIPTION OF THE PREFERRED EMBODIMENTS

The present invention provides a method for preparing cooked rice with barley in an aseptic packing system, comprising the steps of:

(1) pre-treating barley by soaking barley, which has been milled to a predetermined polishing level, in purified water at 10 to 30° C. for 1 to 3 hours, dehydrating it, putting a predetermined amount of barley in a package, subjecting it to sterilization treatment at 110 to 130° C. for about 20 to 40 minutes, and then drying the treated barley;

(2) soaking the barley that has been pre-treated in the step (1) in purified water;

(3) washing non-glutinous rice, and then soaking it in purified water;

(4) dehydrating barley and non-glutinous rice that have been soaked in the steps (2) and (3), respectively, mixing barley and non-glutinous rice at a predetermined ratio, and packing them in a heat-resistant plastic container;

(5) subjecting the contents that have been packed in the step (4) to high-pressure sterilization at a high temperature;

(6) cooking barley and rice with steam, using treated water that has been sterilized with UV as cooking water; and (7) sealing the cooked rice with barley using a lid film in a clean room, and steaming, cooling, drying, and then packaging it.

Hereinbelow, the method for preparing cooked rice with barley in an aseptic packing system according to the present invention will be described in detail in terms of each of the steps.

In the method for preparing cooked rice with barley in an aseptic packing system according to the present invention, the step (1) is a step for pre-treating barley by milling barley to a higher polishing level of 40 degree or more than that of barley that is commercially available, soaking the resulting barley in water, dehydrating it, putting it in a package, subjecting it to heat treatment at 110 to 130° C. for 20 to 40 minutes, and then drying it. According to the present invention, by gelatinization and then retrogradation of barley in that order, the barley obtained has excellent appearance, soft and flexible texture, and pleasant flavor and taste, as well as excellent stability against microorganisms present in barley by reducing the initial level of microorganisms.

In the step (2), the pre-treated barley is soaked in purified water from 1 hour to 1 hour and 50 minutes.

In the step (3), non-glutinous rice is fully washed with purified water to remove starch and other impurities present on the surface of the rice grain, and then soaked in purified water from 1 hour to 1 hour and 50 minutes.

In the step (4), the soaked barley and non-glutinous rice are dehydrated, and then the resulting barley and non-glutinous rice are mixed at a predetermined ratio, and then packed in a heat-resistant plastic container. Herein, the barley content is preferably 10 to 60% by weight, and more preferably 20 to 40% by weight, based on the total weight of rice and barley. If the barley content is less than 10% by weight, there is no significant difference from packaged rice that has been cooked with only non-glutinous rice. On the other hand, if the barley content is more than 60% by weight, the user cannot taste the unique texture of barley, whereby the grains are likely to be scattered and the user has a bad taste of the packaged rice.

In the step (5), the container packed with barley and non-glutinous rice is subject to high-pressure sterilization at a temperature of 130 to 150° C. for 4 to 8 seconds, which is repeated four to ten times.

In the step (6), the barley and rice are added with a predetermined amount of treated cooking water that has been sterilized with UV, and then cooked using steam at 100° C. for 30 to 35 minutes.

In the step (7), if cooking is completed, the cooked rice is transferred to a clean room (Class 100 or less, "Standard for Cleanliness in Clean Room" of National aeronautics & space administration (NASA): the number of particles having a size of 0.5 μm or more in 1 ft$^3$: 100), wherein the cooked rice is sealed using a lid film, and steamed, cooled, dried, and then packaged to yield a final product.

The cooked rice with barley in an aseptic packing system prepared by the above-described method is characterized in that by using barley that has been first gelatinized, and then retrogradated, the cooked rice with barley has a reduced initial level of microorganisms in barley, leading to excellent stability against microorganisms, a long-term storage for 6 months or longer at ambient temperature, excellent appearance, pleasant flavor, and soft and flexible texture.

Hereinbelow, preferable Examples will be provided for better understanding of the present invention. However, the following Examples are provided only for the purpose of illustrating the present invention, and thus the scope of the present invention should not be limited thereto.

EXAMPLES 1 TO 8

Preparation of Cooked Rice with Barley in Aseptic Packing System

1. Process for Pre-Treatment of Barley

Barley that has been milled to a polishing level of 40 or more is soaked in purified water, and the water absorption during soaking (weight after soaking/weight before soaking) and the water content at 25° C. depending on soaking time were analyzed according to Experimental Example 1, thereby determining the optimum conditions.

Barley was soaked under an optimum condition of a soaking time of 1 hour and 20 minutes, and a predetermined amount of barley was packaged, and then heat-treated at 121° C. for 20 minutes.

The process for the pre-treatment of barley is shown in FIG. 1.

2. Preparation of Cooked Rice with Barley in Aseptic Packing System

Barley that has been pre-treated in the above-described process and non-glutinous rice were soaked from 1 hour to 1 hour and 50 minutes, and then dehydrated. Then, barley and non-glutinous rice were mixed at a blending ratio as shown in Table 1, put into a heat-resistant container, sealed in a high-temperature, high-pressure sterilizer (manufactured by Shinwa Co., Ltd.), and sterilized at a temperature of 140 to 143° C. with high-pressure steam for 6.5 seconds. This high-temperature steam sterilization was further repeated sever times. After completion of high-temperature steam sterilization, treated cooking water which had been sterilized with UV was poured into each of the sterilized containers in a volume as shown in the following Table 1. The rice with barley was cooked for 35 minutes while maintaining the steam temperature of the cooking machine at 100° C. After the completion of cooking, the resulting rice with barley was sealed with a lid film under aseptic condition, left to stand for about 12 minutes for steaming, and cooled in water at 10° C. for 15 minutes to prepare cooked rice with barley in an aseptic packing system.

The blending ratios of barley and non-glutinous rice in Examples 1 to 8 are shown in Table 1. The process for preparing cooked rice with barley in an aseptic packing system according to the present invention is illustrated in FIG. 2.

TABLE 1

| | | Blending ratio | | |
|---|---|---|---|---|
| Example | Barley content(%) | Non-glutinous rice(g) | Sterilization-treated barley(g) | Cooking water (ml) |
| 1 | 10 | 82.8 | 9.3 | 117.9 |
| 2 | 15 | 78.0 | 13.8 | 118.2 |
| 3 | 20 | 73.1 | 18.4 | 118.5 |
| 4 | 25 | 68.3 | 22.9 | 118.8 |
| 5 | 30 | 63.6 | 27.3 | 119.1 |
| 6 | 40 | 53.9 | 36.7 | 119.7 |
| 7 | 50 | 44.5 | 45.0 | 120.5 |
| 8 | 60 | 35.0 | 53.3 | 121.7 |

COMPARATIVE EXAMPLE 1

Cooked Rice with Barley in Packing System

In Example 1, cooked rice with barley in a packing system was prepared in the same manner as Examples 1 and 2, except that barley was not pre-treated.

EXPERIMENTAL EXAMPLE 1

Physicochemical Analysis of Barley

1. Measurement of Water Absorption and Water Content of Barley depending on soaking Time at 25° C.

In order to determine the soaking time of barley, barley that has been milled to a polishing level of 40 or more was soaked in purified water, and the water absorption during soaking (weight after soaking/weight before soaking) and the water content at a temperature of 25° C. with soaking time were analyzed, thereby determining the optimum conditions. The results are shown in Table 2, and FIGS. 3 and 4.

TABLE 2

| | Time (min) | | | | | | | | |
|---|---|---|---|---|---|---|---|---|---|
| | 10 | 20 | 30 | 40 | 50 | 60 | 70 | 80 | 90 |
| water absorption rate | 1.3 | 1.38 | 1.44 | 1.48 | 1.5 | 1.54 | 1.61 | 1.6 | 1.62 |
| water content (%) | 31.8 | 35.6 | 38.9 | 40.1 | 41.2 | 42.5 | 44.2 | 45 | 46 |

| | Time (min) | | | | | | | | |
|---|---|---|---|---|---|---|---|---|---|
| | 100 | 110 | 120 | 130 | 140 | 150 | 160 | 170 | 180 |
| water absorption rate | 1.66 | 1.68 | 1.71 | 1.72 | 1.75 | 1.77 | 1.79 | 1.79 | 1.79 |
| water content (%) | 46.9 | 47.2 | 48.2 | 48.9 | 49.5 | 49.7 | 50.5 | 50.3 | 50.1 |

As shown in Table 2, and FIGS. 3 and 4, as for the appearance after sterilization treatment, barley with a water content of less than 40% was not sufficiently soaked on the whole, and as a result, the color of barley was not uniform. Barley with a water content of 50% or more was much stickier, and as a result, the processing property was deteriorated. Therefore, it was believed that a soaking time of barley at 25° C. is preferably about 1 to 3 hours.

2. Measurement of Water Absorption During Soaking and Water Content of Barley at Various Temperatures and Various Times Barley that has been milled to a polishing level of 40 or more was soaked in purified water, and the water absorption during soaking (weight after soaking/weight before soaking) and the water content depending on soaking time at a temperature in the range from 10 to 30° C. were analyzed. The results are shown in Table 3.

TABLE 3

| | Time (min) | | | | | |
|---|---|---|---|---|---|---|
| | water absorption rate | | | water content (%) | | |
| Temperature (° C.) | 40 | 80 | 120 | 40 | 80 | 120 |
| 10° C. | 1.35 | 1.43 | 1.49 | 36.95 | 40.99 | 43.12 |
| 20° C. | 1.38 | 1.49 | 1.58 | 38.36 | 43.14 | 46.26 |
| 30° C. | 1.49 | 1.65 | 1.75 | 41.75 | 47.03 | 50.04 |

As shown in Table 3, barley had a water content of 40% or more at 10 to 20° C. after 1 hour and 20 minutes, and a water content of 40% or more at 30° C. after 40 minutes. Thus, it can be found that as the soaking temperature increases, the soaking time decreases.

EXPERIMENTAL EXAMPLE 2

Analysis of Microorganisms in Barley

Barley was soaked under the optimum condition as determined in Experimental Example 1, that is, for a soaking time of 1 hour and 20 minutes, and a predetermined amount of barley was packaged. The packaged barley was heat-treated at 121° C. for 20 minutes, and dried, and thereafter, the number of microorganisms in barley was measured.

The results are shown in Table 4.

TABLE 4

| Treatment of sample | Samples | Number of general bacteria CFU/g | Number of heat-resistant bacteria CFU/g | |
|---|---|---|---|---|
| | | | 100° C./10 min | 80° C./30 min |
| Before sterilization | Commercially available barley (Polishing level: 36) | $4.6 \times 10^3$ | 0 | $1.0 \times 10^1$ |
| | Milled barley (Polishing level: 40 or more) | $3.2 \times 10^3$ | 0 | 0 |
| After sterilization | Sterilized barley | $3.5 \times 10^1$ | 0 | 0 |

As shown in Table 4, by heat treatment, the number of general bacteria in barley as a raw material showed 2-log reduction, and the heat-resistant bacteria were all killed.

EXPERIMENTAL EXAMPLE 3

Test on Bacteria Growth in Cooked Rice with Barley in Aseptic Packing System of the Present Invention In order to examine whether microorganisms grow in the cooked rice with barley in an aseptic packing system prepared in Examples 1 to 8, a test on bacteria growth was performed. Generally, the test on bacteria growth is a process for analyzing microorganisms in completely sterilized foods in cans, bottles, or retorts, but in the present experiment, in order to examine whether microorganisms grow during storage, twenty samples of the cooked rice with barley in an aseptic packing system per each Example were prepared in the same manners as Examples 1 to 8, and tested on whether microorganisms grew by a common test on bacteria growth. The "negative" in the test on bacteria growth means that the product has been sterilized and safe without microorganism growth during storage.

The results are shown in Table 5.

TABLE 5

| | Test on Bacteria Growth (Sample No.: 20 per each example) |
|---|---|
| Example 1 | all negative |
| Example 2 | all negative |
| Example 3 | all negative |
| Example 4 | all negative |
| Example 5 | all negative |
| Example 6 | all negative |
| Example 7 | all negative |
| Example 8 | all negative |

As shown in Table 5, the results of the test on bacteria growth of the cooked rice with barley in an aseptic packing system according to the present invention showed all negative, indicating that the cooked rice with barley is safe without microorganism growth during storage.

EXPERIMENTAL EXAMPLE 4

Test on Denaturation of Cooked Rice with Barley in Aseptic Packing System According to the Present Invention Twenty samples of the cooked rice with barley in an aseptic packing system per each Example were prepared in the same manners as Examples 1 to 8, stored at ambient temperature for 12 months, and their decomposition was observed over a period of time. In the present experiment, the criteria for denaturation are as follows. If there is any sign of microorganism growth on the surface of or in the cooked rice with barley, the cooked rice with barley was considered to be denatured.

As a result of observation, on denaturation of the cooked rice with barley over a period of time, it was found that the cooked rice with barley in an aseptic packing system according to the present invention did not showed any sign indicating abnormality. This indicates that the cooked rice with barley is safe without denaturation occurring due to microorganisms.

EXPERIMENTAL EXAMPLE 5

Sensory Test

In order to compare the overall quality of the cooked rice with barley in an aseptic packing system as prepared in Examples 1 to 8, and Comparative Example 1, a sensory test was performed with 250 common consumers. The sensory test was consisted of five items, that is, appearance, stickiness, texture, flavor, and overall taste. The scores of the sensory test were expressed by a five-point scale (5: Very good, 4: Good, 3: Moderate, 2: Poor, and 1: Very poor).

The results are shown in Table 6.

TABLE 6

| | Sensory test(five-point scale) | | | | |
|---|---|---|---|---|---|
| | appearance | stickiness | texture | flavor | overall taste |
| Example 1 | 3.5 | 4.0 | 3.7 | 3.7 | 3.8 |
| Example 2 | 3.9 | 4.0 | 3.8 | 3.7 | 4.0 |
| Example 3 | 3.9 | 4.0 | 3.9 | 3.9 | 4.2 |
| Example 4 | 3.8 | 3.8 | 3.9 | 3.9 | 4.1 |
| Example 5 | 3.8 | 3.7 | 3.9 | 3.7 | 3.9 |
| Example 6 | 3.9 | 3.6 | 3.8 | 3.8 | 3.8 |
| Example 7 | 3.6 | 3.5 | 3.8 | 3.5 | 3.8 |
| Example 8 | 3.6 | 3.5 | 3.7 | 3.5 | 3.7 |
| Comparative Example 1 | 3.4 | 3.4 | 3.1 | 3.6 | 3.5 |

As shown in Table 6, the cooked rice with barley in an aseptic packing system according to the present invention exhibited excellent appearance, stickiness, texture, flavor, and overall taste as assessment results, as compared with the cooked rice with barley in a packing system in Comparative Example 1. From this, it is believed that barley in an aseptic packing system according to the present invention has soft and unique texture, by gelatinizing barley with heat treatment and then drying it, thereby increasing the absorption of water during soaking and gelatinization during the preparation of the cooked rice with barley.

EFFECTS OF THE INVENTION

The method for preparing cooked rice with barley in an aseptic packing system according to the present invention is characterized in that by using barley that has been first gelatinized and then retrogradated, the cooked rice with barley has a reduced initial level of microorganisms in barley, leading to excellent stability against microorganisms, a long storage life of 6 months or longer at ambient temperature, excellent appearance, pleasant flavor, and soft, flexible and sticky texture.

What is claimed is:

1. A method for preparing cooked rice with barley in an aseptic packing system, comprising the steps of:
   (1) pre-treating barley by soaking barley, which has been milled to a predetermined polishing level, in purified water at 10 to 30° C. for 1 to 3 hours, dehydrating the soaked barley, putting a predetermined amount of the dehydrated barley in a package, subjecting the dehydrated barley in the package to sterilization treatment at 110 to 130° C. for about 20 to 40 minutes, and then drying the sterilized barley;
   (2) soaking the pre-treated barley in purified water;
   (3) washing non-glutinous rice, and then soaking the washed non-glutinous rice in purified water;
   (4) dehydrating the pre-treated barley and the non-glutinous rice that have been soaked in the steps (2) and (3), respectively, mixing the dehydrated pre-treated barley and the dehydrated non-glutinous rice at a predetermined ratio to form a mixture of pre-treated barley and non-glutinous rice, and packing the mixture in a heat-resistant plastic container;
   (5) subjecting the mixture that has been packed in the step (4) to high-pressure sterilization at a high temperature;
   (6) cooking the sterilized mixture with steam, using treated water that has been sterilized with UV as cooking water, to form a cooked rice with barley; and
   (7) sealing the cooked rice with barley using a lid film in a clean room, and steaming, cooling, drying, and then packaging the cooked rice with barley.

2. The method for preparing cooked rice with barley in an aseptic packing system according to claim 1, wherein the barley in the step (1) is a barley milled to a polishing level of 40 or more.

3. The method for preparing cooked rice with barley in an aseptic packing system according to claim 1, wherein the dehydrated pre-treated barley in the step (4) is mixed in an amount of 10 to 60% by weight, based on a total weight of the mixture of pre-treated barley and non-glutinous rice.

4. The method for preparing cooked rice with barley in an aseptic packing system according to claim 1, wherein in the step (5), the high-pressure sterilization is performed at a temperature of 130 to 150° C. for 4 to 8 seconds, which is repeated four to ten times.

5. The method for preparing cooked rice with barley in an aseptic packing system according to claim 1, wherein in the step (6), the cooking with steam is performed at 100° C. for 30 to 35 minutes.

6. A method for preparing cooked rice with barley in an aseptic packing system, consisting of the steps of:
   (1) pre-treating barley by soaking barley, which has been milled to a predetermined polishing level, in purified water at 10 to 30° C. for 1 to 3 hours, dehydrating the soaked barley, putting a predetermined amount of the dehydrated barley in a package, subjecting the dehydrated barley in the package to sterilization treatment at 110 to 130° C. for about 20 to 40 minutes, and then drying the sterilized barley;
   (2) soaking the pre-treated barley in purified water;
   (3) washing non-glutinous rice, and then soaking the washed non-glutinous rice in purified water;
   (4) dehydrating the pre-treated barley and the non-glutinous rice that have been soaked in the steps (2) and (3), respectively, mixing the dehydrated pre-treated barley and the dehydrated non-glutinous rice at a predetermined ratio to form a mixture of pre-treated barley and non-glutinous rice, and packing the mixture in a heat-resistant plastic container;
   (5) subjecting the mixture that has been packed in the step (4) to high-pressure sterilization at a high temperature;
   (6) cooking the sterilized mixture with steam, using treated water that has been sterilized with UV as cooking water, to form a cooked rice with barley; and
   (7) sealing the cooked rice with barley using a lid film in a clean room, and steaming, cooling, drying, and then packaging the cooked rice with barley.

* * * * *